US010069906B2

(12) United States Patent
Kono et al.

(10) Patent No.: US 10,069,906 B2
(45) Date of Patent: Sep. 4, 2018

(54) METHOD AND APPARATUS TO DEPLOY APPLICATIONS IN CLOUD ENVIRONMENTS

(71) Applicant: Hitachi, Ltd., Tokyo (JP)

(72) Inventors: Yasutaka Kono, Sunnyvale, CA (US); Hironori Emaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 15/109,825

(22) PCT Filed: Apr. 29, 2014

(86) PCT No.: PCT/US2014/035799
§ 371 (c)(1),
(2) Date: Jul. 6, 2016

(87) PCT Pub. No.: WO2015/167447
PCT Pub. Date: Nov. 5, 2015

(65) Prior Publication Data
US 2016/0337445 A1 Nov. 17, 2016

(51) Int. Cl.
*G06F 15/16* (2006.01)
*H04L 29/08* (2006.01)
(Continued)

(52) U.S. Cl.
CPC ............ *H04L 67/101* (2013.01); *G06F 3/067* (2013.01); *G06F 3/0608* (2013.01);
(Continued)

(58) Field of Classification Search
CPC ...... G06F 9/5077; G06F 3/0619; G06F 3/065; G06F 3/067; G06F 3/0641; G06F 3/0689;
(Continued)

(56) References Cited

U.S. PATENT DOCUMENTS 8,443,077 B1 * 5/2013 Lappas .................. G06F 9/5077
709/224
9,135,269 B2 * 9/2015 Shetty .................. H04L 67/1095
(Continued)

OTHER PUBLICATIONS

International Search Report of PCT/US2014/035799 dated Sep. 18, 2014.

*Primary Examiner* — Zarni Maung
(74) *Attorney, Agent, or Firm* — Mattingly & Malur, PC

(57) ABSTRACT

A management computer comprises: a memory configured to store server information identifying functionalities which can be executed by each of a plurality of servers and applications running on each of the servers, and storage system information identifying functionalities which can be executed by each of a plurality of storage systems and application data stored in each of the storage systems; and a processor configured to: select a server, in which an application is to be deployed, from the plurality of servers, and a storage system, on which a volume either contains data to be used to deploy the application or maps to another volume that contains the data to be used to deploy the application, from the plurality of storage systems, based on the server information and the storage system information, and request to deploy the application on the selected server and create the volume on the selected storage system.

18 Claims, 18 Drawing Sheets

(51) Int. Cl.
*G06F 3/06* (2006.01)
*G06F 8/61* (2018.01)
*G06F 12/0813* (2016.01)
*G06F 12/1009* (2016.01)
*G06F 12/00* (2006.01)
*G06F 9/455* (2018.01)

(52) U.S. Cl.
CPC .......... *G06F 3/0641* (2013.01); *G06F 3/0652* (2013.01); *G06F 8/61* (2013.01); *G06F 12/0813* (2013.01); *G06F 12/1009* (2013.01); *H04L 67/1097* (2013.01); *G06F 2009/4557* (2013.01); *G06F 2212/1044* (2013.01); *G06F 2212/154* (2013.01); *G06F 2212/60* (2013.01); *G06F 2212/62* (2013.01)

(58) Field of Classification Search
CPC ........... G06F 17/30156; G06F 2201/84; G06F 3/0608; G06F 3/061; G06F 11/1453; G06F 11/1464; G06F 17/30091; G06F 11/1451

See application file for complete search history.

(56) References Cited

U.S. PATENT DOCUMENTS

| | | | |
|---|---|---|---|
| 2010/0005175 A1* | 1/2010 | Swildens | G06F 9/50 709/226 |
| 2010/0011368 A1* | 1/2010 | Arakawa | G06F 3/0604 718/104 |
| 2012/0213069 A1* | 8/2012 | Oguchi | H04W 80/06 370/231 |
| 2013/0132954 A1 | 5/2013 | Bolte et al. | |
| 2014/0201489 A1* | 7/2014 | Deguchi | G06F 12/0246 711/170 |

* cited by examiner

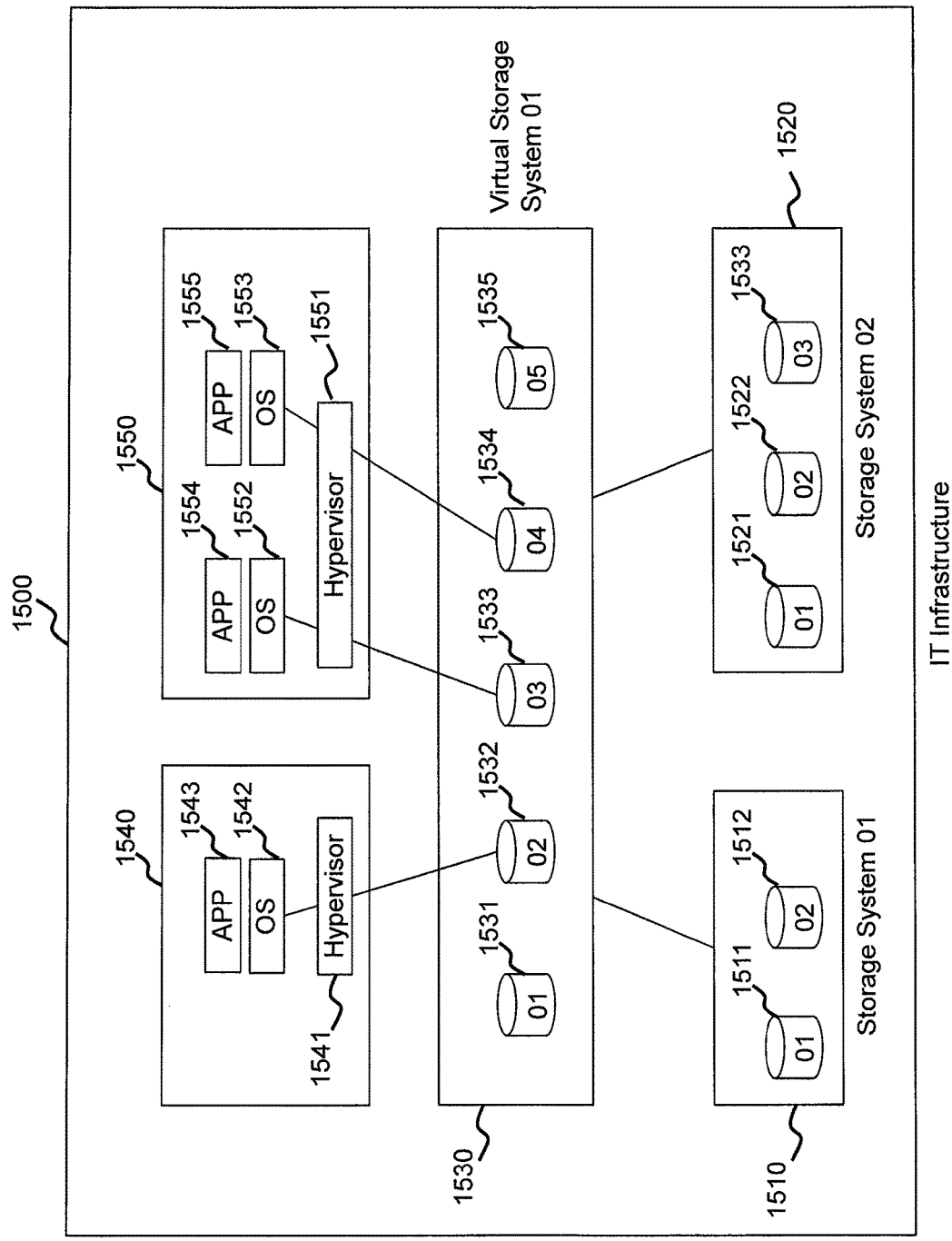
Fig. 1-A

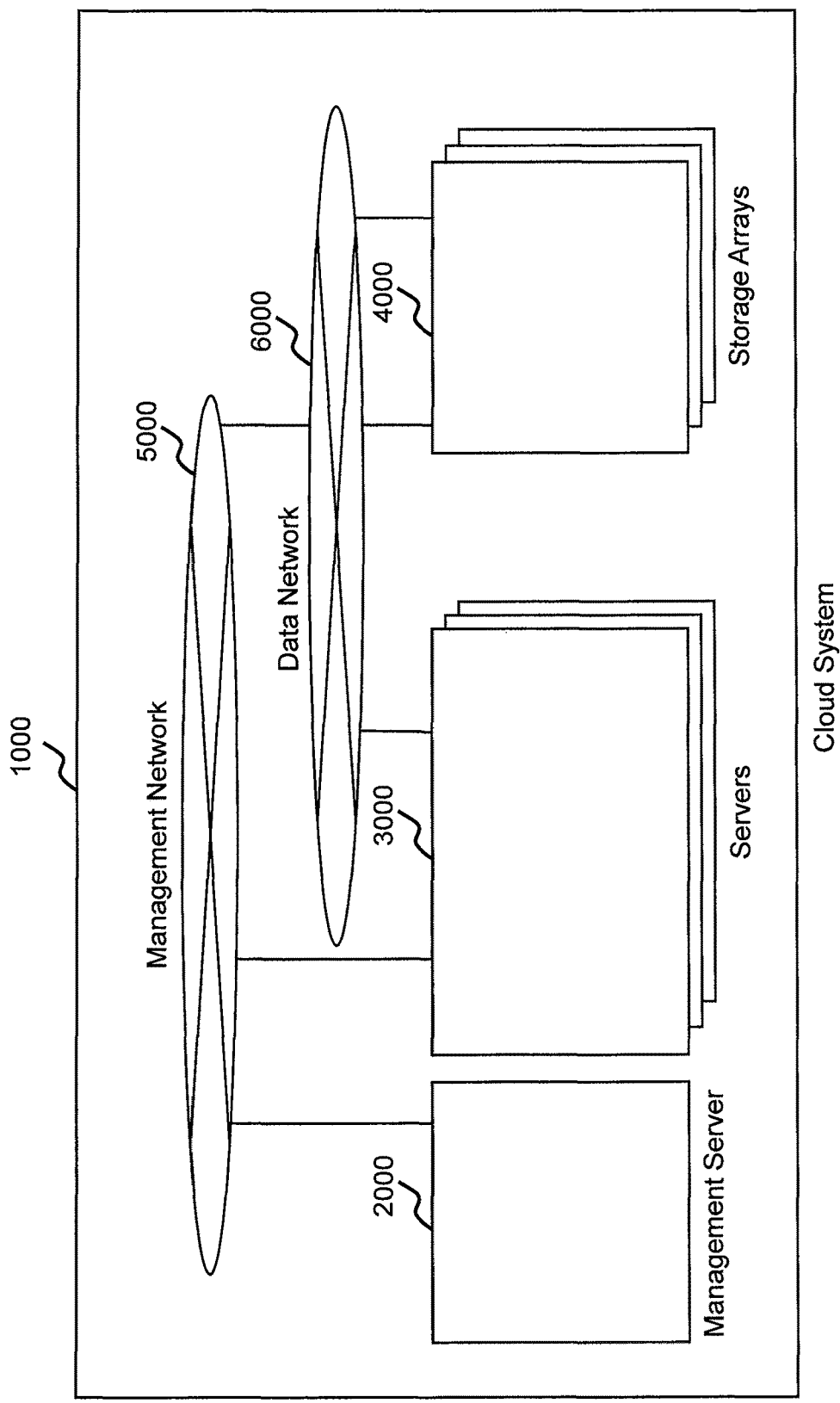

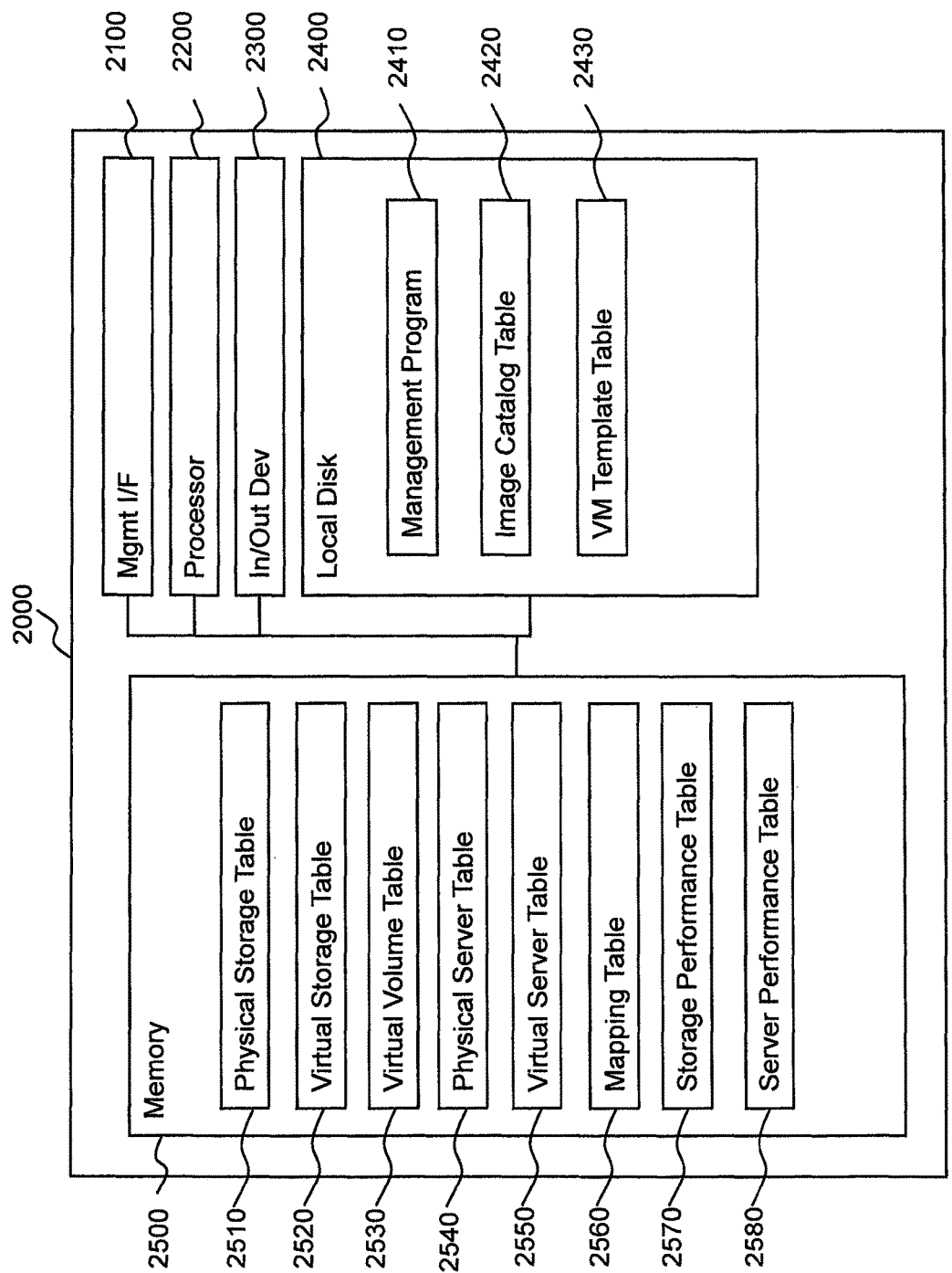
Fig. 2-A

| | 2421 | 2422 | 2423 | 2424 |
|---|---|---|---|---|
| | ID | Type | Description | Location |
| 242A | 01 | OS | SUSE 10.0 | Storage System 01 Volume 01 |
| 242B | 02 | DB | MySQL 2.4 on Ubuntu 13.04 | Storage System 01 Volume 02 |
| 242C | 03 | Web Server | Apache 2.0 on SUSE 10.0 | Storage System 02 Volume 01 |
| | .. | .. | .. | .. |

| | 2431 | 2432 | 2433 | 2434 | 2435 | 2436 | 2437 | 2438 |
|---|---|---|---|---|---|---|---|---|
| 2430 | ID | VM Type | Processor Type | Processor Performance | # of Processors | Memory | Max IOPS | Unit Price |
| 243A | 01 | Normal | Normal | 1 | 2 | 4GB | 50,000 | 10 |
| 243B | 02 | High Memory | High | 10 | 8 | 32GB | 100,000 | 30 |
| 243C | 03 | High CPU | GPU | 20 | 16 | 8GB | 100,000 | 80 |
| 243D | 04 | High I/O | High | 10 | 16 | 8GB | 500,000 | 90 |
| | .. | .. | .. | .. | .. | .. | .. | .. |

| | 2511 | 2512 | 2513 | 2514 | 2515 |
|---|---|---|---|---|---|
| | ID | Port (Gbps) | Cache (GB) | Array Group (TB) | Deduplication functionality |
| 251A | 01 | A(8),B(8),C(8),D(8) | C-01 (160), C-02 (128) | AG-002(300), AG-102(300) | installed |
| 251B | 02 | A(8), B(8) | C-01 (128) | AG-001(200), AG-101(500) | installed |
| 251C | 03 | A(8), B(8) | C-01 (32) | AG-004(1000), AG-005(500) | n/a |
| | .. | .. | .. | .. | |

| | 2521 | 2522 | 2523 | 2524 | 2525 |
|---|---|---|---|---|---|
| | ID | Physical Storage ID | Port (Gbps) | Cache (GB) | Array Group (TB) |
| 252A | 01 | 01 | A(8),B(8),C(8),D(8) | C-01 (160), C-02 (128) | AG-001(300), AG-002(300) |
| | | 02 | E(8), F(8) | C-03 (128) | AG-003(200), AG-004(500) |
| | | 03 | G(8), H(8) | C-04 (32) | AG-005(1000), AG-006(500) |
| | .. | | .. | .. | .. |

2520

| Virtual Storage ID 2531 | Virtual Volume ID 2532 | Physical Storage ID 2533 | Physical Volume ID 2534 | Cache (GB) 2535 | Capacity (TB) 2536 |
|---|---|---|---|---|---|
| 01 | 01 | 01 | 01 | 32 | 80 |
| 01 | 02 | 01 | 02 | 32 | 80 |
| 01 | 03 | 02 | 01 | 16 | 120 |
| 01 | 04 | 02 | 02 | 16 | 120 |
| 01 | 05 | 02 | 03 | 8 | 40 |
| .. | .. | .. | .. | .. | .. |

| | ID | CPU (# of core, Type) | Memory | Port (Gbps) | Deduplication functionality |
|---|---|---|---|---|---|
| 254A | 01 | 12 Core, Normal | 32GB | A(4), B(4) | installed |
| 254B | 02 | 32 Core, High | 256 GB | A(8), B(8) | installed |
| 254C | 03 | 24 Core, High | 256 GB | A(8) | n/a |
| 254D | 04 | 24 Core, High | 128 GB | A(16), B(16) | n/a |

2540 — table; columns labeled 2541, 2542, 2543, 2544, 2545

Fig. 9

| | ID | Physical Server ID | CPU (# of core) | Memory | Port (Gbps) |
|---|---|---|---|---|---|
| 255A | 01 | 01 | 2 Core | 4 GB | A(4) |
| 255B | 02 | 01 | 8 Core | 32 GB | B(8) |
| 255C | 03 | 02 | 16 Core | 8 GB | A(8) |
| 255D | 04 | 02 | 16 Core | 8 GB | A(16) |

2550 — table; columns labeled 2551, 2552, 2553, 2554, 2555

| | Application ID 2561 | Application Name 2562 | Catalog ID 2563 | Virtual Server ID 2564 | Virtual Server Name 2565 | Virtual Server Port 2566 | Virtual Storage ID 2567 | Virtual Storage Port 2568 | Virtual Volume ID 2569 |
|---|---|---|---|---|---|---|---|---|---|
| 256A | 1 | OLTP-B | 2 | 01 | OLTP-B-1 | A | 01 | A | 011 |
| | | | | 02 | OLTP-B-2 | A | 01 | C | 021 |
| | | | | | | B | 02 | C | 022 |
| 256B | 2 | Web-C | 4 | 03 | WebDB | A | 02 | B | 052 |
| | | | | | | A | 01 | A | 055 |
| 256C | 3 | OLAP-E | 3 | 04 | OLAP-E-1 | C | 03 | D | 063 |
| | | | | 05 | OLAP-E-2 | B | 02 | C | 105 |
| 256D | 2 | Web-C | 4 | 06 | WebLogic | D | 01 | A | 120 |
| | | | | 07 | WebFront-1 | B | 03 | A | 050 |
| | | | | | | B | 03 | B | 051 |
| 256E | 4 | DEV-C | 6 | 08 | Dev-C-1 | C | 04 | C | 023 |
| | | | | 09 | Dev-C-2 | A | 05 | D | 225 |
| 256F | 2 | Web-C | 4 | 10 | WebFront-2 | C | 05 | E | 221 |
| 256G | 5 | Mail-A | 5 | 11 | Mail-A-1 | D | 04 | A | 235 |
| | | | | 12 | Mail-A-2 | E | 06 | A | 248 |
| | | | | | | A | 04 | B | 249 |
| | | | | 13 | Mail-A-3 | A | 03 | C | 101 |
| | | | | 14 | Mail-A-4 | B | 04 | B | 111 |

| Storage ID | History ID | Cache Usage | Array Group Usage | Port Usage |
|---|---|---|---|---|
| 01 | 0 | 15% | 30% | 50% |
| | 1 | 20% | 34% | 34% |
| | 2 | 23% | 45% | 40% |
| | .. | .. | .. | .. |
| .. | | | | |

Fig. 11

| Server ID | History ID | CPU Usage | | | Memory Usage | Disk Usage | Port Usage |
|---|---|---|---|---|---|---|---|
| | | CPU 0 | ... | CPU 31 | | | |
| 01 | 0 | 14% | ... | 22% | 24% | 50% | 30% |
| | 1 | 15% | ... | 18% | 30% | 70% | 34% |
| | 2 | 14% | ... | 19% | 25% | 66% | 40% |
| | .. | .. | ... | .. | .. | .. | .. |

Fig. 12

| VM Name | CPU | Memory | Capacity |
|---|---|---|---|
| Mail-A-1 | 16 x High | 8GB | 2TB |
| Mail-A-2 | 16 x High | 8GB | 2TB |
| Mail-A-3 | 16 x High | 8GB | 2TB |
| Mail-A-4 | 16 x High | 8GB | 2TB |

1651-B, 1652-B, 1653-B, 1654-B

1600-B

Application Type: Mail — 1610-B
Application Name: Mail-A — 1620-B
Size: 500 Mailbox — 1630-B
Period: 2 Years — 1640-B
Provisioned VM: — 1650-B
 165A-B, 165B-B, 165C-B, 165D-B Unit Cost: 360 — 1660-B OK — 1670-B    Cancel — 1680-B    Back — 1690-B

Fig. 14

| | ID | Type | Description | Location | Tendency |
|---|---|---|---|---|---|
| 242A' | 01 | OS | SUSE 10.0 | Storage System 01 Volume 01 | n/a |
| 242B' | 02 | DB | MySQL 2.4 on Ubuntu 13.04 | Storage System 01 Volume 02 | capacity |
| 242C' | 03 | Web Server | Apache 2.0 on SUSE 10.0 | Storage System 02 Volume 01 | performance |
| | .. | .. | .. | .. | |

METHOD AND APPARATUS TO DEPLOY APPLICATIONS IN CLOUD ENVIRONMENTS

BACKGROUND OF THE INVENTION

The present invention relates generally to computer systems and, more particularly, to method and apparatus to deploy applications in cloud environments.

Cloud computing has become widely used. There are several solutions to utilize multiple cloud computing environments. For example, a cloud environment is managed and used based on following role allotment. The infrastructure administrator manages IT resources and stores these into resource pools. Application administrator obtains IT resources from the resource pool using a self-service portal to execute his/her applications. Several problems exist. In a cloud computing environment, users cannot select servers on which applications (VMs) are deployed because they do not identify the infrastructure within the cloud. Performance and/or capacity efficiency will vary greatly depending on which servers the applications (VMs) will be deployed. In the case where servers and/or storages have deduplication functionality, it is better to deploy applications (VMs) on servers on which other applications (VMs) created by using the same application catalog are already running from a capacity efficiency perspective. On the other hand, deploying many applications (VMs) on the same servers will cause performance bottleneck.

U.S. Patent Application Publication No. US2013/0132954 relates to a mechanism for image deployment in a cloud environment comprising at least two hosts coupled to at least one disk, and at least one virtual machine created in at least one host of the at least two hosts by deploying an additional image to the at least one disk. The method is characterized in that the at least one host for deploying an additional image is selected according to a deployment factor representing a communality relationship between one or more existing base images in the cloud environment and the additional image. This reference does not consider configurations of servers and storages and their capabilities of deduplication functionalities in deploying applications (VMs). Nor does it disclose changing the configurations of servers and storages or changing the criteria for deciding where to deploy applications (VMs) according to the type of the applications.

BRIEF SUMMARY OF THE INVENTION

Exemplary embodiments of the invention provide a scheme for deploying applications (VMs) by considering the servers on which other applications (VMs) created by using the same application catalog are deployed, whether the servers have deduplication functionalities, and performance of the servers. When no candidate servers are found, the scheme provides ways for deploying applications (VMs) by considering storages that have volumes in which other applications (VMs) created by using the same application catalog are contained, whether the storages have deduplication functionalities, and performance of the storages. When no candidate storages are found, the scheme provides ways for deploying applications (VMs) by changing the configurations of the storages. This includes virtualizing volumes in which the other applications (VMs) created by using the same application catalog are contained to other storages, copying or migrating volumes in which the other applications (VMs) created by using the same application catalog are contained to other volumes on the same storages or other storages, and changing I/O paths from servers to storages. The scheme further provides ways for deploying applications (VMs) by changing the criteria for deciding where to deploy applications (VMs) according to the type of the applications. For instance, in the case of deploying web servers, distributing loads of servers is considered more important than capacity efficiency. In the case of deploying file servers, capacity efficiency is considered more important than the performance of servers. In a specific embodiment, the scheme is implemented in the form of a management program.

This invention discloses how to decrease costs to execute applications, especially in a cloud environment. The management program deploys applications on suitable servers from suitable storages from perspectives of both capacity efficiency and performance.

One aspect of the present invention is directed to a management computer coupled to a plurality of servers and a plurality of storage systems. The management computer comprises: a memory being configured to store server information identifying functionalities which can be executed by each of the plurality of servers and applications running on each of the plurality of servers, and storage system information identifying functionalities which can be executed by each of the plurality of storage systems and application data stored in each of the plurality of storage systems; and a processor being configured to: select a server, in which an application is to be deployed, from the plurality of servers, and a storage system, on which a volume either contains data to be used to deploy the application or maps to another volume that contains the data to be used to deploy the application, from the plurality of storage systems, based on the server information and the storage system information, and request to deploy the application on the selected server and create the volume on the selected storage system.

In some embodiments, selecting the server comprises: determining whether one or more servers of the plurality of servers have deduplication functionality; determining whether one or more servers of the plurality of servers have one or more other applications running thereon that are deployed from a same application catalog as the application; determining whether one or more servers of the plurality of servers have loads that are below a preset server load threshold; if one or more servers of the plurality of servers have deduplication functionality, have one or more other applications running thereon that are deployed from the same application catalog as the application, and have loads that are below the preset server load threshold (criterion 1), then selecting the server having the lowest load from the one or more servers under criterion 1; otherwise, if one or more servers of the plurality of servers have deduplication functionality, and have loads that are below the preset server load threshold, but do not have one or more other applications running thereon that are deployed from the same application catalog as the application (criterion 2), then selecting the server having the lowest load from the one or more servers under criterion 2; otherwise, if one or more servers of the plurality of servers have loads that are below the preset server load threshold, but do not have deduplication functionality and do not have one or more other applications running thereon that are deployed from the same application catalog as the application (criterion 3), then selecting the server having the lowest load from the one or more servers under criterion 3.

In specific embodiments, selecting the storage system comprises: finding a storage system from the plurality of storage systems which has a volume containing a golden image of the application; determining whether the found storage system has a storage load below a preset storage load threshold; if the server was selected from the one or more servers under criterion 1 or criterion 2 and if the found storage system has a storage load below the preset storage load threshold, then selecting the found storage system; and if the server was selected from the one or more servers under criterion 1 or criterion 2 and if the found storage system has a storage load not below the preset storage load threshold, then virtualizing, copying, or migrating the volume of the found storage system to another storage system of the plurality of storage systems and selecting the another storage system.

In some embodiments, selecting the storage system comprises: finding a storage system from the plurality of storage systems which has a volume containing a golden image of the application; determining whether the found storage system has deduplication functionality; determining whether the found storage system has a storage load below a preset storage load threshold; if the server was selected from the one or more servers under criterion 3, the found storage system has deduplication functionality, and the found storage system has a storage load below the preset storage load threshold, then selecting the found storage system; and if the server was selected from the one or more servers under criterion 3, the found storage system has deduplication functionality, and the found storage system has a storage load not below the preset storage load threshold, then virtualizing, copying, or migrating the volume of the found storage system to another storage system of the plurality of storage systems and selecting the another storage system.

In specific embodiments, electing the storage system comprises: finding a storage system from the plurality of storage systems which has a volume containing a golden image of the application; determining whether the found storage system has deduplication functionality; determining whether the found storage system has a storage load below a preset storage load threshold; finding one or more other storage systems of the plurality of storage systems that include a same virtual storage as one that the found storage system includes; determining whether the found one or more other storage systems have deduplication functionality; if the server was selected from the one or more servers under criterion 3, the found storage system has no deduplication functionality, the found one or more other storage systems do not have deduplication functionality, and the found storage system has a storage load below the preset storage load threshold, then selecting the found storage system; if the server was selected from the one or more servers under criterion 3, the found storage system has no deduplication functionality, the found one or more other storage systems do not have deduplication functionality, and the found storage system has a storage load not below the preset storage load threshold, then virtualizing, copying, or migrating the volume of the found storage system to another storage system of the plurality of storage systems and selecting the another storage system; and if the server was selected from the one or more servers under criterion 3, the found storage system has no deduplication functionality, the found one or more other storage systems have deduplication functionality, then virtualizing, copying, or migrating the volume of the found storage system to one of the one or more other storage systems and selecting the one storage system having the virtualized, copied, or migrated volume.

In some embodiments, the server is selected based on whether performance of the server is more important than capacity efficiency of the server or not. Selecting the server comprises: determining whether one or more servers of the plurality of servers have deduplication functionality; determining whether one or more servers of the plurality of servers have one or more other applications running thereon that are deployed from a same application catalog as the application; determining whether one or more servers of the plurality of servers have loads that are below a preset server load threshold; if the performance of the selected server is not more important than the capacity efficiency of the server, and if one or more servers of the plurality of servers have deduplication functionality, have one or more other applications running thereon that are deployed from the same application catalog as the application, and have loads that are below the preset server load threshold (criterion 1), then selecting the server having the lowest load from the one or more servers under criterion 1; otherwise, if the performance of the selected server is not more important than the capacity efficiency of the server, and if one or more servers of the plurality of servers have deduplication functionality, and have loads that are below the preset server load threshold, but do not have one or more other applications running thereon that are deployed from the same application catalog as the application (criterion 2), then selecting the server having the lowest load from the one or more servers under criterion 2; otherwise, if one or more servers of the plurality of servers have loads that are below the preset server load threshold, but do not have deduplication functionality and do not have one or more other applications running thereon that are deployed from the same application catalog as the application (criterion 3), then selecting the server having the lowest load from the one or more servers under criterion 3.

In specific embodiments, selecting the storage system comprises: finding a storage system from the plurality of storage systems which has a volume containing a golden image of the application; determining whether the found storage system has a storage load below a preset storage load threshold; if the server was selected from the one or more servers under criterion 1 or criterion 2 and if the found storage system has a storage load below the preset storage load threshold, then selecting the found storage system; and if the server was selected from the one or more servers under criterion 1 or criterion 2 and if the found storage system has a storage load not below the preset storage load threshold, then virtualizing, copying, or migrating the volume of the found storage system to another storage system of the plurality of storage systems and selecting the another storage system.

In some embodiments, selecting the storage system comprises: finding a storage system from the plurality of storage systems which has a volume containing a golden image of the application; determining whether the found storage system has deduplication functionality; determining whether the found storage system has a storage load below a preset storage load threshold; if the server was selected from the one or more servers under criterion 3, the found storage system has deduplication functionality, and the found storage system has a storage load below the preset storage load threshold, then selecting the found storage system; and if the server was selected from the one or more servers under criterion 3, the found storage system has deduplication functionality, and the found storage system has a storage load not below the preset storage load threshold, then virtualizing, copying, or migrating the volume of the found storage system to another storage system of the plurality of storage systems and selecting the another storage system.

In specific embodiments, selecting the storage system comprises: finding a storage system from the plurality of storage systems which has a volume containing a golden image of the application; determining whether the found storage system has deduplication functionality; determining whether the found storage system has a storage load below a preset storage load threshold; finding one or more other storage systems of the plurality of storage systems that include a same virtual storage as one that the found storage system includes; determining whether the found one or more other storage systems have deduplication functionality; if the server was selected from the one or more servers under criterion 3, the found storage system has no deduplication functionality, one or more other storage systems of the plurality of storage systems include the same virtual storage as one that the found storage system includes and do not have deduplication functionality, and the found storage system has a storage load below the preset storage load threshold, then selecting the found storage system; if the server was selected from the one or more servers under criterion 3, the found storage system has no deduplication functionality, one or more other storage systems of the plurality of storage systems include the same virtual storage as one that the found storage system includes and do not have deduplication functionality, and the found storage system has a storage load not below the preset storage load threshold, then virtualizing, copying, or migrating the volume of the found storage system to another storage system of the plurality of storage systems and selecting the another storage system; and if the server was selected from the one or more servers under criterion 3, the found storage system has no deduplication functionality, one or more other storage systems of the plurality of storage systems include the same virtual storage as one that the found storage system includes and have deduplication functionality, then virtualizing, copying, or migrating the volume of the found storage system to one of the one or more other storage systems and selecting the one storage system having the virtualized, copied, or migrated volume.

In accordance with another aspect of the invention, a method for managing a plurality of servers and a plurality of storage systems comprises: storing server information identifying functionalities which can be executed by each of the plurality of servers and applications running on each of the plurality of servers, and storage system information identifying functionalities which can be executed by each of the plurality of storage systems and application data stored in each of the plurality of storage systems; selecting a server, in which an application is to be deployed, from the plurality of servers, and a storage system, on which a volume either contains data to be used to deploy the application or maps to another volume that contains the data to be used to deploy the application, from the plurality of storage systems, based on the server information and the storage system information, and requesting to deploy the application on the selected server and create the volume on the selected storage system.

These and other features and advantages of the present invention will become apparent to those of ordinary skill in the art in view of the following detailed description of the specific embodiments.

BRIEF DESCRIPTION OF THE DRAWINGS

FIG. 1-A shows an example of a logical configuration of the IT infrastructure of FIG. 1.

FIG. 2 shows an example of the physical configuration of the cloud system of FIG. 1.

FIG. 2-A shows an example of the configuration of the management server of FIG. 2.

FIG. 3 shows an example of the image catalog table 2420 according to the first embodiment.

FIG. 4 shows an example of the VM template table.

FIG. 5 shows an example of the physical storage table.

FIG. 6 shows an example of the virtual storage table.

FIG. 7 shows an example of the virtual volume table.

FIG. 8 shows an example of the physical server table.

FIG. 9 shows an example of the virtual server table.

FIG. 10 shows an example of the mapping table.

FIG. 11 shows an example of the storage performance table.

FIG. 12 shows an example of the server performance table.

FIG. 14 shows an example of the confirmation GUI of the self-service portal.

FIG. 16 shows an example of the image catalog table according to the second embodiment.

DETAILED DESCRIPTION OF THE INVENTION

Figure 1:
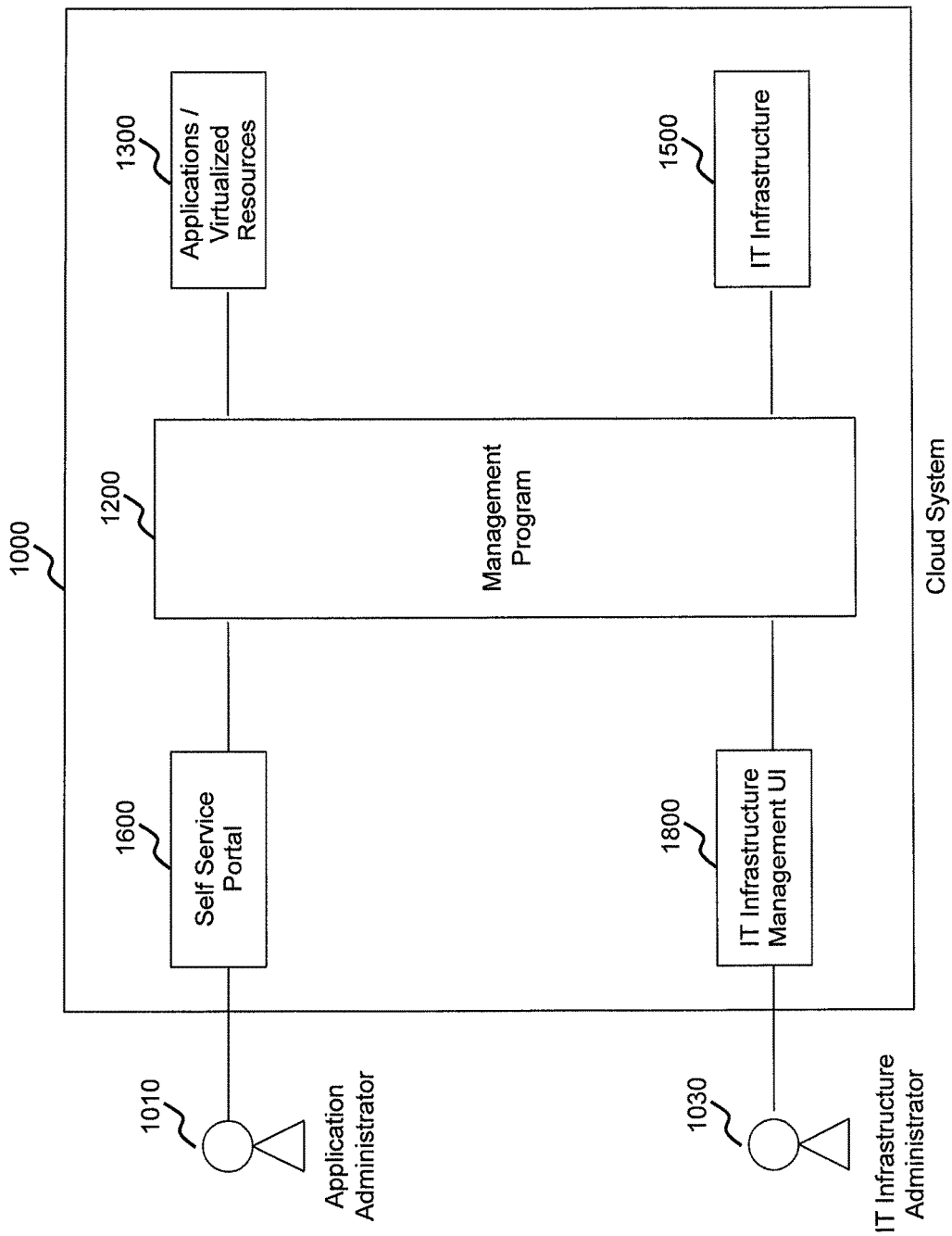
FIG. 1 illustrates an example of a logical configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transitory medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for deploying applications in cloud environments.

First Embodiment

This embodiment discloses how a management program deploys applications (VMs) on servers by considering various factors.

FIG. 1 illustrates an example of a logical configuration of a system in which the method and apparatus of the invention may be applied. A cloud system 1000 includes a management program 1200, applications and virtualized resources 1300, an IT infrastructure 1500, a self-service portal 1600, and an IT infrastructure management user interface 1800. An application administrator 1010 uses this system via the self-service portal 1600. An IT infrastructure administrator 1030 uses this system via an IT infrastructure management user interface 1800.

FIG. 1-A shows an example of a logical configuration of the IT infrastructure 1500 of FIG. 1. An application 1543 and an OS (Operating System) 1542 are running on a hypervisor 1541. This hypervisor 1541 is running on a server 1540. Applications 1554, 1555 and OS 1552, 1553 are running on a hypervisor 1551. This hypervisor 1551 is running on a server 1550. The application 1543 uses a virtual volume 1532 of the virtual storage system 01 (1530). The application 1554 uses a virtual volume 1533 of the virtual storage system 01 (1530). The application 1555 uses a virtual volume 1534 of the virtual storage system 01 (1530). These virtual volumes 1532, 1533, and 1534 are provisioned from physical storage systems 01 (1510) and 02 (1520).

FIG. 2 shows an example of the physical configuration of the cloud system of FIG. 1. The cloud system 1000 includes a management server 2000, servers 3000, storage arrays 4000, a management network 5000, and a data network 6000. The servers 3000 and storage arrays 4000 are connected via the data network 6000. This network can be LAN (Local Area Network) or WAN (Wide Area Network), but it is not limited to them. The management server 2000, servers 3000, and storage arrays 4000 are connected via the management network 5000. This network is usually LAN, but it is not limited to that. Although the management network and data network are separated in this embodiment, they can be a single converged network. In this embodiment, the management server 2000 and servers 3000 are separated, but the invention is not limited to that. For example, any server can host a management program. In this embodiment, the servers 3000 and storage arrays 4000 are separated, but the invention is not limited to that. For example, the servers and storages arrays can be combined into one system.

FIG. 2-A shows an example of a configuration of the management server 2000 of the cloud system 1000. A management interface 2100 is an interface to the management network 5000. An input and output device 2300 is a user interface such as a monitor, a keyboard, and a mouse. A local Disk 2400 contains a management program 2410 (same as 1200 in FIG. 1), an image catalog table 2420 (FIG. 3), and a VM template table 2430 (FIG. 4). The management program 2410 is loaded to a memory 2500 and executed by a processor 2200. The process of the management program 2410 is described later using FIG. 15. The image catalog table 2420 and VM template table 2430 are loaded to the memory 2500 and used by the management program 2410. The memory 2500 contains a physical storage table 2510 (FIG. 5), a virtual storage table 2520 (FIG. 6), a virtual volume table 2530 (FIG. 7), a physical server table 2540 (FIG. 8), a virtual server table 2550 (FIG. 9), a mapping table 2560 (FIG. 10), a storage performance table 2570 (FIG. 11), and a server performance table 2580 (FIG. 12).

FIG. 3 shows an example of the image catalog table 2420 according to the first embodiment. This catalog is referred to when the application administrator 1010 deploys applications by using the self-service portal 1600. This table is loaded from the local disk 2400 to the memory 2500 of the management server 2000. Column 2421 shows the identifications of the catalogs. Column 2422 shows the types of the applications. Column 2423 shows the descriptions of the applications. Column 2424 shows the locations of storage volumes in which the applications are contained. These storage volumes are called "golden images." Rows 242A-242C each show an image catalog. For example, row 242A shows the catalog of an Operating System. This catalog contains the SUSE 10.0 Linux image. This image is located on the volume 01 of the storage system 01. The three rows 242A-242C list three different application catalogs in this example. Each application catalog typically represents different application name and/or version and/or different OS name/version; however, the invention is not limited to this way of cataloging applications.

FIG. 4 shows an example of the VM template table 2430. This table describes the resource configurations of several VM types. This table is loaded from the local disk 2400 to the memory 2500 of the management server 2000. Column 2431 shows the identifications of the templates. Column 2432 shows the VM types. Column 2433 shows the processor types. The values of the column can be normal, high memory, high CPU, or High I/O. Column 2434 shows the processor performance. The values are relative values on the basis of normal CPU. Column 2435 shows the numbers of processors. Column 2436 shows the capacities of the memories. Column 2437 shows the maximum IOPS (Input/Output Operations per Second). Column 2438 shows the unit prices. Rows 243A-243D each show the resource configuration of a VM type. For example, row 243A shows the configuration of the normal VM. This type of VM contains two normal processors and 4 GB memory. The unit price of this type of VM is 10.

FIG. 5 shows an example of the physical storage table 2510. This table is created in the memory 2500 by the management program 2410. Column 2511 shows the identifications of the physical storage arrays. Column 2512 shows the port resources of each physical storage array. Column 2513 shows the cache resources of each physical storage array. Column 2514 shows the array group resources of each physical storage array. Column 2515 shows whether deduplication functionalities are installed on the physical storage arrays or not. Rows 251A-251C each show the configuration of a physical storage array. For example, row 251A shows the configuration of physical storage array 01. The physical storage array has 8 Gbps each of ports A, B, C and D, 160 GB of cache C-01 and 128 GB of cache C-02, and 300 TB of array group AG-002 and 300 TB of array group AG-102, and it has deduplication functionality installed.

FIG. 6 shows an example of the virtual storage table 2520. This table is created in the memory 2500 by the management program 2410. Column 2521 shows the identifications of the virtual storage arrays. Column 2522 shows the identifications of the physical storage arrays which contain the virtual storage arrays. Column 2523 shows the assigned port resources to each virtual storage array. Column 2524 shows the assigned cache resources to each virtual storage array. Column 2525 shows the assigned array groups to each virtual storage array. Each row shows the configuration of a virtual storage array. For example, row 252A shows the configuration of virtual storage array 01. Physical storage arrays 01, 02, and 03 contain the virtual storage array. This means that resources of these physical storage arrays are assigned to the virtual storage array. The virtual storage array has 8 Gbps each of ports A, B, C, D, E, F, G, and H, 160 GB of cache C-01, 128 GB of cache C-02, 128 GB of cache C-03, and 32 GB of cache C-04, and 300 TB of array group AG001, 300 TB of array group AG002, 200 TB of array group AG003, 500 TB of array group AG004, 1000 TB of array group AG005, and 500 TB of array group AG006.

FIG. 7 shows an example of the virtual volume table 2530. This table is created in the memory 2500 by the management program 2410. Column 2531 shows the identifications of the virtual storage arrays owning the virtual storage volumes. Column 2532 shows the identifications of the virtual storage volumes. Column 2533 shows the identifications of the physical storage arrays that have the physical volume assigned to the virtual volumes. Column 2534 shows the identifications of the physical storage volumes assigned to the virtual volumes. Column 2535 shows the cache resources assigned to each virtual volume. Column 2536 shows the capacity of each virtual volume. Rows 253A-253E each show the configuration of a virtual volume. For example, row 253A shows the configuration of virtual volume 01 of virtual storage array 01. The virtual volume is assigned from physical volume 01 of physical storage 01. The virtual volume has 32 GB of cache resources and 80 TB of capacity assigned.

FIG. 8 shows an example of the physical server table 2540. This table is created in the memory 2500 by the management program 2410. Column 2541 shows the identifications of physical servers. Column 2542 shows the numbers of cores and types of CPU of each physical server. Column 2543 shows the capacities of memories of each physical server. Column 2544 shows the port resources of each physical server. Column 2545 shows whether deduplication functionalities are installed on the physical servers or not. Rows 254A-254D each show the configuration of a physical server. For example, row 254A shows the configuration of physical server 01. The physical server has 12 cores of Normal CPU, 32 GB of memory, 4 Gbps each of ports A and B, and deduplication functionality installed.

FIG. 9 shows an example of the virtual server table 2550. This table is created in the memory 2500 by the management program 2410. Column 2551 shows the identifications of the virtual servers. Column 2552 shows the identifications of the physical servers on which the virtual servers are running. Column 2553 shows numbers of CPU cores assigned to each virtual server. Column 2554 shows capacities of memories assigned to each virtual server. Column 2555 shows port resources assigned to each virtual server. Rows 255A-255D each show the configuration of a virtual server. For example, row 255A shows the configuration of virtual server 01. The virtual server is hosted on the physical server 01 and has 2 CPU cores, 4 GB of memory, and 4 Gbps of port A.

FIG. 10 shows an example of the mapping table 2560. This table is created in the memory 2500 by the management program 2410. Column 2561 shows the identifications of the applications. Column 2562 shows the names of the applications. This name is specified in the application name field 1620-A of the GUI 1600-A of the self-service portal 1600 by the application administrator 1010. Column 2563 shows the identifications of the image catalogs. Application type is selected in the application type field 1610-A of the GUI 1600-A of the self-service portal 1600 (FIG. 13) by the application administrator 1010. By matching this information and the type column 2422 in the image catalog table 2420, the identification is decided. Column 2564 shows the identifications of the virtual servers on which the applications are running. Column 2565 shows the names of the virtual servers. In this embodiment, these names are automatically created based on application name by the management program, but the invention is not limited to this. For example, the application administrator can specify the name of each virtual server. Column 2566 shows the identifications of the ports of the virtual servers. Column 2567 shows the identifications of the virtual servers. Column 2568 shows the identifications of the ports of the virtual storages. Column 2569 shows the identifications of the virtual volumes.

Rows 256A-256G each show the end-to-end mapping between applications and virtual volumes. For example, row 256B shows that the application 2 has name of "Web-C," is created from image catalog 4, and is running on the virtual server 03 whose name is "WebDB." Also, two virtual volumes 052 and 055 are assigned to the virtual server 03 for the application. The virtual volume 052 of virtual storage 02 is assigned to the virtual server 03 through the port B of the virtual storage and the port A of the virtual server. The virtual volume 055 of virtual storage 01 is assigned to the virtual server 03 through the port A of the virtual storage and the port A of the virtual server.

FIG. 11 shows an example of the storage performance table 2570. This table is created in the memory 2500 by the management program 2410. Column 2571 shows the identifications of the physical and/or virtual storage arrays. Column 2572 shows the identifications of historical performance data of the storage arrays. Timestamps may be used as the history ID 2572. Column 2573 shows the usage rate of the caches of the storage arrays. Column 2574 shows the usage rate of the array group of the storage arrays. Column 2575 shows the usage rate of the ports of the storage arrays. Each row shows the historical performance data of a storage array. For example, row 257 A shows the performance data of storage array 01 which has at least three historical data (from 0 to 2).

FIG. 12 shows an example of the server performance table 2580. This table is created in the memory 2500 by the management program 2410. Column 2581 shows the identifications of the physical and/or virtual servers. Column 2582 shows the identifications of historical performance data of the servers. Timestamps may be used as the history ID 2582. Column 2583 shows the usage rate of the CPUs of the servers. Column 2584 shows the usage rate of the memories of the servers. Column 2585 shows the usage rate of the disks of the servers. Column 2586 shows the usage rate of the ports of the servers. Each row shows the historical performance data of a server. For example, row 258A shows the performance data of server 01 which has at least three historical data (from 0 to 2).

Figure 13:
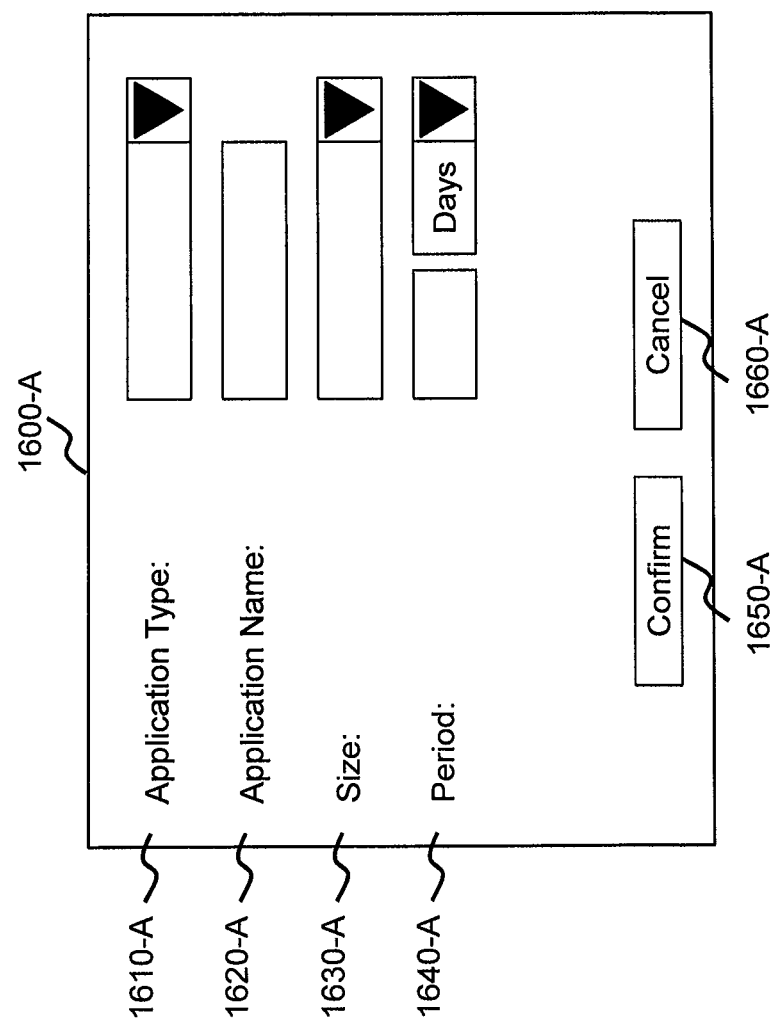
FIG. 13 shows an example of the GUI of the self-service portal.

FIG. 13 shows an example of the GUI 1600-A of the self-service portal 1600. This GUI is used when the application administrator 1010 deploys applications on the cloud system 1000. The application administrator selects application type 1610-A (for example, "Mail"). Candidates are displayed based on the description 2423 of the catalog table 2420 (FIG. 3). Next, the application administrator inputs an application name 1620-A (for example, "Mail-A"). Next, the application administrator selects the size of the application 1630-A. For example, unit of the mail application is 500 boxes. Therefore the application administrator can select multiples of 500. Next, the application administrator inputs the period of the application usage 1640-A (for example, 2 years). The unit of the period can be hours, days, months and years, but it is not limited to them. If a "Cancel" button 1660A is clicked, the management program 2410 cancels the deployment process. If a "Confirm" button 1650-A is clicked, the management program 2410 displays the confirmation GUI 1600-B.

FIG. 14 shows an example of the confirmation GUI 1600-B of the self-service portal 1600. This GUI is displayed after the application administrator clicked the "Confirm" button 1650-A of the application deployment GUI 1600-A of the self-service portal 1600 in FIG. 13. Field 1610-B is the application type. Field 1620-B is the application name. Field 1630-B is the size of the application. Field 1640-B is the period of the application usage. Field 1650-B is the information of the VMs being provisioned. Column 1651-B is the name of the VM. This name is created from the application name 1620-B by the management program 2410. Column 1652-B is the number and type of the CPU. Column 1653-B is the capacity of the memory. Column 1654-B is the capacity of storage volumes. Rows 165A-B to 165D-B each show the configuration of a VM. For example, row 165A-B shows the configuration of the VM named "Mail-A-1." This VM has 16 of High CPU, 8 GB memory, and 2 TB of storage volume. Field 1660-B is the calculated unit cost of the application. According to the unit price 2438 of the VM template table 2430 (FIG. 4), the unit cost of one "High I/O" VM is 90. The number of "High I/O" VM allocated for this application is 4. Therefore, the unit cost of this application is 360. The unit cost can include the cost of storage volumes. If a "Cancel" button 1680-B is clicked, the management program 2410 cancels the deployment process. If a "Back" button 1690-B is clicked, the management program 2410 redisplays the provisioning GUI 1600-A of the self-service portal 1600. If a "Confirm" button 1670-B is clicked, the management program 2410 executes application deployment process.

Figure 15:
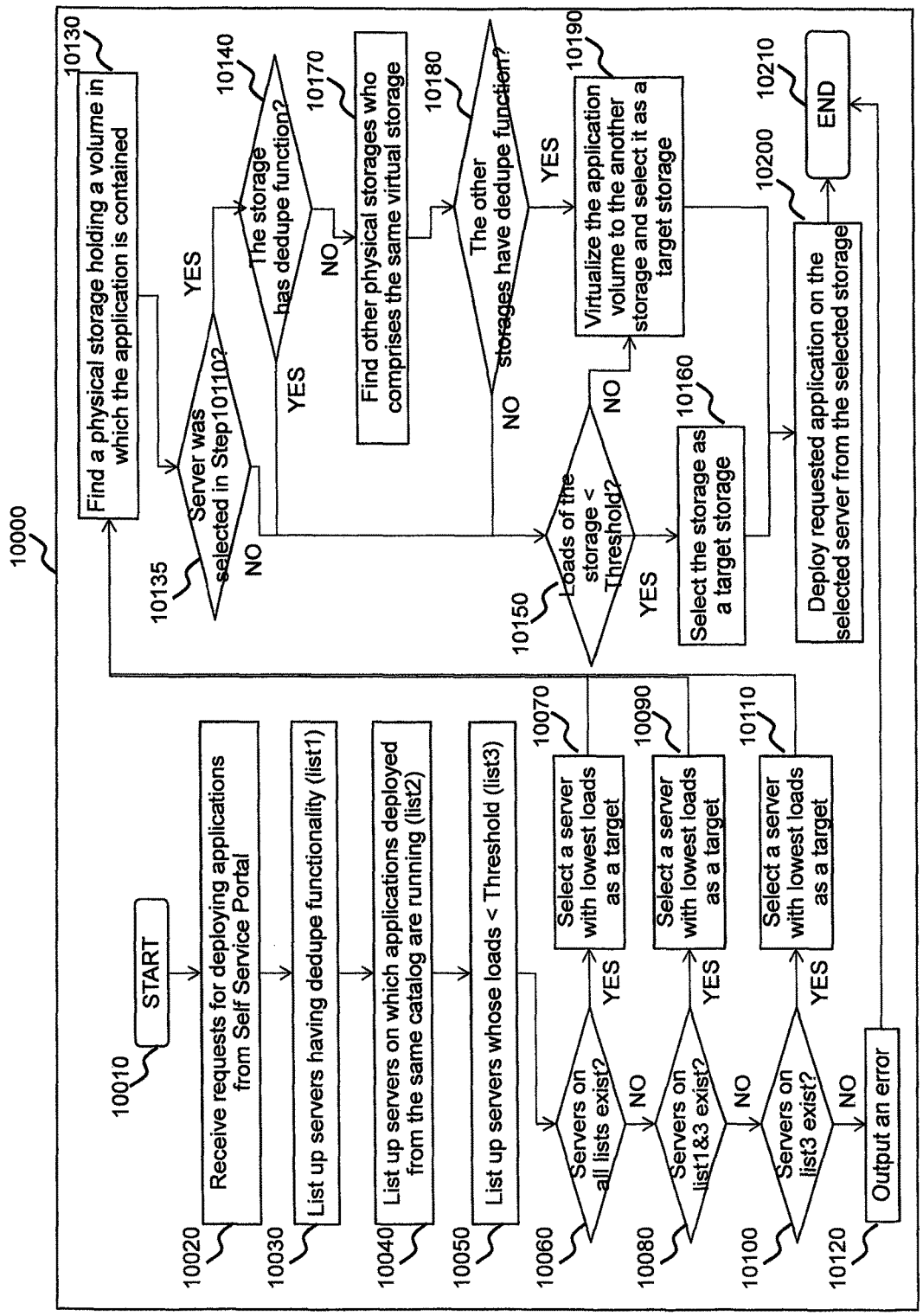
FIG. 15 shows an example of a flow diagram illustrating a process of the management program in management server according to the first embodiment.

FIG. 15 shows an example of a flow diagram illustrating a process of the management program 2410 in management server 2000 according to the first embodiment. The process starts in step 10010. In step 10020, the management program 2410 receives a request for deploying applications from the self-service portal 1600. The parameters shown in FIG. 14 (Self Service Portal—Confirmation GUI) are passed to the management program 2410. In step 10030, the management program 2410 lists up servers having dedupe functionality. This list is called "list1" in the following sequences. In step 10040, the management program 2410 lists up servers on which applications deployed from the same catalog are running. This list is called "list2" in the following sequences. In step 10050, the management program 2410 lists up servers whose loads are less than a threshold. The threshold can be pre-defined or specified by the IT infrastructure administrator 1030. This list is called "list3" in the following sequences. For example, each server has a server load that is calculated by summing CPU usage, memory usage, and port IOPS (Input/Output Operations per Second), typically using weighting factors but not required. That server load is compared with the preset server load threshold. The thresholds can be pre-defined or specified by the IT infrastructure administrator 1030.

In step 10060, the management program 2410 checks if servers on all lists (list1, list2, and list3) exist or not. If the result is "Yes" (criterion 1 satisfied), then the process proceeds to step 10070. If the result is "No," then the process proceeds to step 10080. In step 10070, the management program 2410 selects one of the servers on all lists (list 1, list2, and list3) as a target of application deployment (under criterion 1). A server with the lowest server load can be selected, for example. In step 10080, the management program 2410 judges whether servers on both list1 and list3 exist or not. If the result is "Yes" (criterion 2 satisfied), then the process proceeds to step 10090. If the result is "No," then the process proceeds to step 10100. In step 10090, the management program 2410 selects one of the servers on both list1 and list2 as a target of application deployment (under criterion 2). A server with the lowest server load can be selected, for example. In step 10100, the management program 2410 judges whether servers on list3 exist or not. If the result is "Yes" (criterion 3 satisfied), then the process proceeds to step 10110. If the result is "No," then the process proceeds to step 10120. In step 10110, the management program 2410 selects one of the servers on list3 as a target of application deployment (under criterion 3). A server with the lowest server load can be selected, for example. In step 10120, the management program 2410 displays an error message indicating that no candidate servers are found for deployment of the application.

In step 10130, the management program 2410 refers to the location column 2424 of the image catalog table 2420 (FIG. 3) and finds a physical storage holding a volume in which the application (i.e., golden image) is contained. This can be done by comparing the application type input value via 1610-B (FIG. 14) and the values of type column 2422. In step 10135, the management program 2410 checks if the server was selected in Step 10110 or not. The server selected in Step 10110 does not have deduplication functionality while the server selected in Step 10070 or 10090 has it. If the result is "Yes" (i.e., no deduplication functionality), then the process proceeds to step 10140. If the result is "No," then the process proceeds to step 10150.

In step 10140, the management program 2410 checks if the storage array found in step 10120 has deduplication functionality or not by referring to the deduplication functionality column 2515 of the physical storage table 2510 (FIG. 5). If the result is "Yes," then the process proceeds to step 10150. If the result is "No," then the process proceeds to step 10170. In step 10150, the management program 2410 checks if loads of the storage array found in step 10120 are less than a preset threshold or not. The thresholds can be pre-defined or specified by the IT infrastructure administrator 1030. If the result is "Yes," then the process proceeds to step 10160. If the result is "No," then the process proceeds to step 10190. For example, each storage has a storage load that is calculated by summing CPU usage, memory usage, and port IOPS (Input/Output Operations per Second), typically using weighting factors but not required. That storage load is compared with the preset storage load threshold.

In step 10160, the management program 2410 selects the storage array found in step 10130 as a target storage array being used in the application deployment process. In step 10170, the management program 2410 refers to the physical storage table 2510 (FIG. 5) and the virtual storage table 2520 (FIG. 6), and finds other physical storages that include the same virtual storage as the one the physical storage array found in step 10130 has. For example, assuming that the physical storage array 01 was found in step 10130, then the physical storage array 02 and 03 would be found in this process because these three physical storage arrays comprise the same virtual storage array 01. In step 10180, the management program 2410 checks if the other storage arrays found in step 10170 have deduplication functionalities or not by referring to the deduplication functionality column 2515 of the physical storage table 2510 (FIG. 5). If the result is "Yes," then the process proceeds to step 10190. If the result is "No," then the process proceeds to step 10150. In step 10190, the management program 2410 virtualizes the application volume to one of the other storage arrays that includes the same virtual storage array and has deduplication functionality. This process is not limited to virtualization but copying or migrating the volume to another storage array can be used instead. In step 10200, the management program 2410 deploys the requested application on the server selected in step 10070, 10090, or 10110 from the storage selected in step 10160 or step 10190. Deployment can be done by creating a writable snapshot from the application volume (i.e., "golden images") or copying data in the application volume to another volume. In step 10210, the application deployment process of the management program 2410 ends.

Figure 15A:
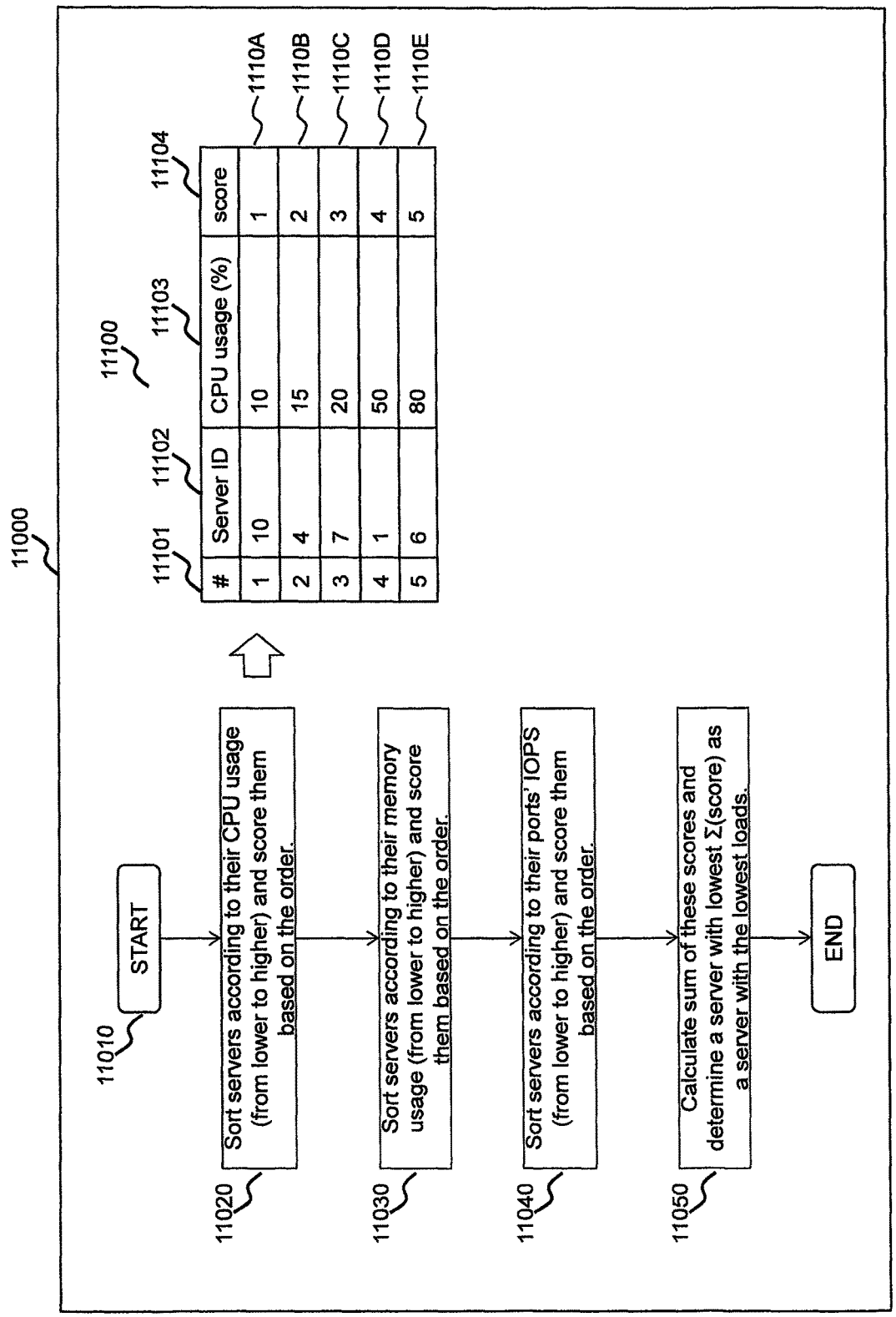
FIG. 15A shows an example of a flow diagram illustrating a process of identifying the server with the lowest server load.

FIG. 15A shows an example of a flow diagram 11000 illustrating a process of identifying the server with the lowest server load. In this example, the loads are evaluated based on CPU usage, memory usage, and port IOPS (Input/Output Operations per Second). In another example, different factors may be considered. After starting (11010), the method in FIG. 15A sorts the servers according to their CPU usage (from lower to higher) and scores them based on the order (11020), sorts the servers according to their memory usage (from lower and higher) and scores them based on the order (11030), and sorts the servers according to their port's IOPS (from lower to higher) and scores them based on the order (11040). An example of sorting the servers according to their CPU usage is illustrated with a table 11100 having columns for number 11101, server ID 11102, CPU usage 11103, and score 11104, and rows 1110A to 1110E representing five servers. Finally, the method calculates the sum of the scores and determines a server with the lowest total score as the server with the lowest server load (11050). The three types of scores (corresponding to the three types of loads) can be weighted in the summing step according to a preset criterion. A similar approach can be used to identify the storage with the lowest storage load.

In the flow diagram 10000, the management program checks deduplication capabilities of servers prior to the ones of storages. This is because deduplicating data on servers is better for reducing data transferred from servers to storages via networks. In this embodiment, the management program deploys applications on servers from storage volumes by considering the servers on which other applications (VMs) created by using the same application catalog are deployed, whether the servers have deduplication functionalities and performance of the servers. In the case where no candidate servers are found, the management program performs the deployment by considering the storages having volumes in which the other applications (VMs) created by using the same application catalog are contained, whether the storages have deduplication functionalities and performance of the storages. In the case where no candidate storages are found, the management program changes the configurations of the storages. This includes virtualizing volumes in which the other applications (VMs) created by using the same application catalog are contained to other storages, or copying or migrating volumes in which the other applications (VMs) created by using the same application catalog are contained to other volumes on the same storages or other storages. By doing this, applications can be deployed on suitable servers from suitable storages from perspectives of both capacity efficiency and performance. Yet another way to overcome the problem of loads that exceed the threshold is by changing or reconfiguring I/O paths from servers to storages. For example, the load on a port of the storage may be higher than the threshold in a path from a server via the port to a writable snapshot of the golden image. Another path can be formed from the server via another port to another writable snapshot of the golden image so as to reduce the load on each of the ports of the storage.

Second Embodiment

This embodiment discloses how the management program deploys applications (VMs) on servers by changing the criteria for deciding where to deploy applications (VMs) according to the type of the applications.

FIG. 16 shows an example of the image catalog table 2420' according to the second embodiment. Most parts of this table are the same as the image catalog table 2420 in FIG. 3. The only difference between them is that the image catalog table 2420' has the tendency column 2425'. Column 2425' shows the tendency of the application. The tendency may be "capacity," "performance," or "n/a" ("not applicable"). For example, the tendency of the application 02 (row 242B') is "capacity." This means that capacity efficiency is more important for this application than performance.

Figure 17:
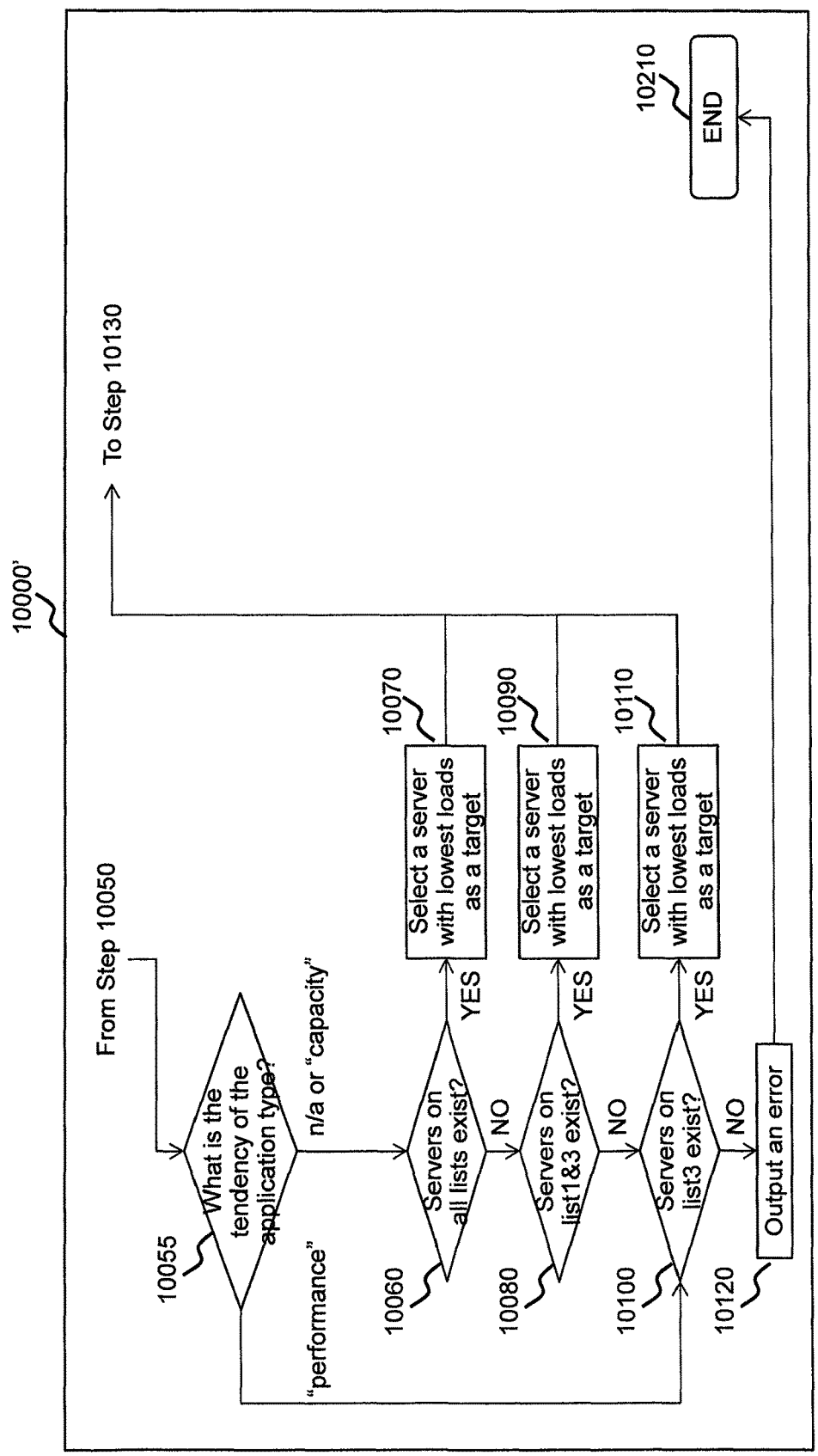
FIG. 17 shows an example of a portion of the flow diagram of the management program in the management server according to the second embodiment.

FIG. 17 shows an example of a portion of the flow diagram of the management program 2410 in the management server 2000 according to the second embodiment. Most parts of the flow diagram 10000' are the same as those of the flow diagram 10000 in FIG. 15. The parts prior to step 10055 and after step 10120 are omitted in FIG. 17. The only difference between FIG. 15 and FIG. 17 is that the flow diagram 10000' in FIG. 17 has an additional conditional branch (step 10055) between step 10050 and step 10060. In step 10055, the management program 2410 refers to the image catalog table 2420' (FIG. 16) and checks the tendency of the application. If the tendency is "performance," then the process proceeds to step 10100. If the tendency is "n/a" or "capacity," the process proceeds to step 10060. This means that in case of applications with "performance" tendency, the management program selects a server with the lowest server load among all servers with less loads than a threshold, regardless of capacity efficiency.

In this embodiment, the management program deploys applications on servers from storage volumes by changing the criteria for deciding where to deploy applications (VMs) according to the type of the applications. For instance, in the case of deploying web servers, distributing loads of servers is considered more important than capacity efficiency. In the case of deploying database servers, capacity efficiency is considered more important than performance of servers. By doing this, applications can be deployed on suitable servers from suitable storages from the perspectives of both capacity efficiency and performance according to the type of the applications.

Of course, the system configuration illustrated in FIG. 2 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for deploying applications in cloud environments. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A management computer coupled to a plurality of servers and a plurality of storage systems, the management computer comprising:
   a memory configured to store server information identifying functionalities which can be executed by each of the plurality of servers and applications running on each of the plurality of servers, and storage system information identifying functionalities which can be executed by each of the plurality of storage systems and application data stored in each of the plurality of storage systems; and
   a processor configured to:
   select a server, in which an application is to be deployed, from the plurality of servers, and a storage system, on which a volume either contains data to be used to deploy the application or maps to another volume that contains the data to be used to deploy the application, from the plurality of storage systems, based on the server information and the storage system information, and
   request to deploy the application on the selected server and create the volume on the selected storage system,
   wherein, in selecting the server, the processor is further configured to:

determine whether one or more servers of the plurality of servers have deduplication functionality;

determine whether one or more servers of the plurality of servers have one or more other applications running thereon that are deployed from a same application catalog as the application;

determine whether one or more servers of the plurality of servers have loads that are below a preset server load threshold;

when one or more servers of the plurality of servers have deduplication functionality, have one or more other applications running thereon that are deployed from the same application catalog as the application, and have loads that are below the preset server load threshold (criterion 1), then select the server having the lowest load from the one or more servers under criterion 1;

when one or more servers of the plurality of servers have deduplication functionality, and have loads that are below the preset server load threshold, but do not have one or more other applications running thereon that are deployed from the same application catalog as the application (criterion 2), then select the server having the lowest load from the one or more servers under criterion 2; and wherein, in selecting the storage system, the processor is further configured to:

find a storage system from the plurality of storage systems which has a volume containing a golden image of the application;

determine whether the found storage system has a storage load below a preset storage load threshold;

when the server was selected from the one or more servers under criterion 1 or criterion 2 and when the found storage system has the storage load below the preset storage load threshold, then select the found storage system; and when the server was selected from the one or more servers under criterion 1 or criterion 2 and when the found storage system has the storage load not below the preset storage load threshold, then virtualize, copy, or migrate the volume of the found storage system to another storage system of the plurality of storage systems and select the another storage system.

2. The management computer according to claim 1, wherein, in selecting the server, the processor is further configured to:

when one or more servers of the plurality of servers have loads that are below the preset server load threshold, but do not have deduplication functionality and do not have one or more other applications running thereon that are deployed from the same application catalog as the application (criterion 3), then select the server having the lowest load from the one or more servers under criterion 3.

3. The management computer according to claim 2, wherein, in selecting the storage system, the processor is further configured to:

determine whether the found storage system has deduplication functionality;

when the server was selected from the one or more servers under criterion 3, the found storage system has deduplication functionality, and the found storage system has the storage load below the preset storage load threshold, then select the found storage system; and when the server was selected from the one or more servers under criterion 3, the found storage system has deduplication functionality, and the found storage system has the storage load not below the preset storage load threshold, then virtualize, copy, or migrate the volume of the found storage system to another storage system of the plurality of storage systems and select the another storage system.

4. The management computer according to claim 2, wherein, in selecting the storage system, the processor is further configured to:

determine whether the found storage system has deduplication functionality;

find one or more other storage systems of the plurality of storage systems that include a same virtual storage as one that the found storage system includes;

determine whether the found one or more other storage systems have deduplication functionality;

when server was selected from the one or more servers under criterion 3, the found storage system has no deduplication functionality, the found one or more other storage systems do not have deduplication functionality, and the found storage system has the storage load below the preset storage load threshold, then select the found storage system;

when the server was selected from the one or more servers under criterion 3, the found storage system has no deduplication functionality, the found one or more other storage systems do not have deduplication functionality, and the found storage system has the storage load not below the preset storage load threshold, then virtualize, copy, or migrate the volume of the found storage system to another storage system of the plurality of storage systems and select the another storage system; and when the server was selected from the one or more servers under criterion 3, the found storage system has no deduplication functionality, the found one or more other storage systems have deduplication functionality, then virtualize, copy, or migrate the volume of the found storage system to one of the one or more other storage systems and select the one storage system having the virtualized, copied, or migrated volume.

5. The management computer according to claim 1, wherein the server is selected based on whether performance of the server is more important than capacity efficiency of the server or not.

6. A management computer comprising:

a memory configured to store server information identifying functionalities which can be executed by each of the plurality of servers and applications running on each of the plurality of servers, and storage system information identifying functionalities which can be executed by each of the plurality of storage systems and application data stored in each of the plurality of storage systems; and a processor configured to:

select a server, in which an application is to be deployed, from the plurality of servers, and a storage system, on which a volume either contains data to be used to deploy the application or maps to another volume that contains the data to be used to deploy the application, from the plurality of storage systems, based on the server information and the storage system information, and request to deploy the application on the selected server and create the volume on the selected storage system, wherein the server is selected based on whether performance of the server is more important than capacity efficiency of the server or not, wherein, in selecting the server, the processor is further configured to:

determine whether one or more servers of the plurality of servers have deduplication functionality;

determine whether one or more servers of the plurality of servers have one or more other applications running thereon that are deployed from a same application catalog as the application;

determine whether one or more servers of the plurality of servers have loads that are below a preset server load threshold;

when the performance of the selected server is not more important than the capacity efficiency of the server, and when one or more servers of the plurality of servers have deduplication functionality, have one or more other applications running thereon that are deployed from the same application catalog as the application, and have loads that are below the preset server load threshold (criterion 1), then select the server having the lowest load from the one or more servers under criterion 1;

when the performance of the selected server is not more important than the capacity efficiency of the server, and when one or more servers of the plurality of servers have deduplication functionality, and have loads that are below the preset server load threshold, but do not have one or more other applications running thereon that are deployed from the same application catalog as the application (criterion 2), then select the server having the lowest load from the one or more servers under criterion 2;

when one or more servers of the plurality of servers have loads that are below the preset server load threshold, but do not have deduplication functionality and do not have one or more other applications running thereon that are deployed from the same application catalog as the application (criterion 3), then select the server having the lowest load from the one or more servers under criterion 3.

7. The management computer according to claim 6, wherein, in selecting the storage system, the processor is further configured to:

find a storage system from the plurality of storage systems which has a volume containing a golden image of the application;

determine whether the found storage system has a storage load below a preset storage load threshold;

when the server was selected from the one or more servers under criterion 1 or criterion 2 and if the found storage system has the storage load below the preset storage load threshold, then select the found storage system; and when the server was selected from the one or more servers under criterion 1 or criterion 2 and when the found storage system has the storage load not below the preset storage load threshold, then virtualize, copy, or migrate the volume of the found storage system to another storage system of the plurality of storage systems and select the another storage system.

8. The management computer according to claim 6, wherein, in selecting the storage system, the processor is further configured to:

find a storage system from the plurality of storage systems which has a volume containing a golden image of the application;

determine whether the found storage system has deduplication functionality;

determine whether the found storage system has a storage load below a preset storage load threshold;

when the server was selected from the one or more servers under criterion 3, the found storage system has deduplication functionality, and the found storage system has the storage load below the preset storage load threshold, then select the found storage system; and when the server was selected from the one or more servers under criterion 3, the found storage system has deduplication functionality, and the found storage system has the storage load not below the preset storage load threshold, then virtualize, copy, or migrate the volume of the found storage system to another storage system of the plurality of storage systems and select the another storage system.

9. The management computer according to claim 6, wherein, in selecting the storage system, the processor is further configured to:

find a storage system from the plurality of storage systems which has a volume containing a golden image of the application;

determine whether the found storage system has deduplication functionality;

determine whether the found storage system has a storage load below a preset storage load threshold;

find one or more other storage systems of the plurality of storage systems that include a same virtual storage as one that the found storage system includes;

determine whether the found one or more other storage systems have deduplication functionality;

when the server was selected from the one or more servers under criterion 3, the found storage system has no deduplication functionality, one or more other storage systems of the plurality of storage systems include the same virtual storage as one that the found storage system includes and do not have deduplication functionality, and the found storage system has the storage load below the preset storage load threshold, then select the found storage system;

when the server was selected from the one or more servers under criterion 3, the found storage system has no deduplication functionality, one or more other storage systems of the plurality of storage systems include the same virtual storage as one that the found storage system includes and do not have deduplication functionality, and the found storage system has the storage load not below the preset storage load threshold, then virtualize, copy, or migrate the volume of the found storage system to another storage system of the plurality of storage systems and select the another storage system; and when the server was selected from the one or more servers under criterion 3, the found storage system has no deduplication functionality, one or more other storage systems of the plurality of storage systems include the same virtual storage as one that the found storage system includes and have deduplication functionality, then virtualize, copy, or migrate the volume of the found storage system to one of the one or more other storage systems and select the one storage system having the virtualized, copied, or migrated volume.

10. A method for managing a plurality of servers and a plurality of storage systems, the method comprising:

storing server information identifying functionalities which can be executed by each of the plurality of servers and applications running on each of the plurality of servers, and storage system information identifying functionalities which can be executed by each of the plurality of storage systems and application data stored in each of the plurality of storage systems;

selecting a server, in which an application is to be deployed, from the plurality of servers, and a storage system, on which a volume either contains data to be used to deploy the application or maps to another volume that contains the data to be used to deploy the application, from the plurality of storage systems, based on the server information and the storage system information; and requesting to deploy the application on the selected server and create the volume on the selected storage system, wherein selecting the server comprises:

determining whether one or more servers of the plurality of servers have deduplication functionality;

determining whether one or more servers of the plurality of servers have one or more other applications running thereon that are deployed from a same application catalog as the application;

determining whether one or more servers of the plurality of servers have loads that are below a preset server load threshold;

when one or more servers of the plurality of servers have deduplication functionality, have one or more other applications running thereon that are deployed from the same application catalog as the application, and have loads that are below the preset server load threshold (criterion 1), then selecting the server having the lowest load from the one or more servers under criterion 1;

when one or more servers of the plurality of servers have deduplication functionality, and have loads that are below the preset server load threshold, but do not have one or more other applications running thereon that are deployed from the same application catalog as the application (criterion 2), then selecting the server having the lowest load from the one or more servers under criterion 2, wherein selecting the storage system comprises:

finding a storage system from the plurality of storage systems which has a volume containing a golden image of the application;

determining whether the found storage system has a storage load below a preset storage load threshold;

when the server was selected from the one or more servers under criterion 1 or criterion 2 and when the found storage system has the storage load below the preset storage load threshold, then selecting the found storage system; and when the server was selected from the one or more servers under criterion 1 or criterion 2 and when the found storage system has the storage load not below the preset storage load threshold, then virtualizing, copying, or migrating the volume of the found storage system to another storage system of the plurality of storage systems and selecting the another storage system.

11. The method according to claim 10, wherein selecting the server comprises:

when one or more servers of the plurality of servers have loads that are below the preset server load threshold, but do not have deduplication functionality and do not have one or more other applications running thereon that are deployed from the same application catalog as the application (criterion 3), then selecting the server having the lowest load from the one or more servers under criterion 3.

12. The method according to claim 11, wherein selecting the storage system comprises:

determining whether the found storage system has deduplication functionality;

when the server was selected from the one or more servers under criterion 3, the found storage system has deduplication functionality, and the found storage system has the storage load below the preset storage load threshold, then selecting the found storage system; and when the server was selected from the one or more servers under criterion 3, the found storage system has deduplication functionality, and the found storage system has the storage load not below the preset storage load threshold, then virtualizing, copying, or migrating the volume of the found storage system to another storage system of the plurality of storage systems and selecting the another storage system.

13. The method according to claim 11, wherein selecting the storage system comprises:

determining whether the found storage system has deduplication functionality;

finding one or more other storage systems of the plurality of storage systems that include a same virtual storage as one that the found storage system includes;

determining whether the found one or more other storage systems have deduplication functionality;

when the server was selected from the one or more servers under criterion 3, the found storage system has no deduplication functionality, the found one or more other storage systems do not have deduplication functionality, and the found storage system has the storage load below the preset storage load threshold, then selecting the found storage system;

when the server was selected from the one or more servers under criterion 3, the found storage system has no deduplication functionality, the found one or more other storage systems do not have deduplication functionality, and the found storage system has the storage load not below the preset storage load threshold, then virtualizing, copying, or migrating the volume of the found storage system to another storage system of the plurality of storage systems and selecting the another storage system; and when the server was selected from the one or more servers under criterion 3, the found storage system has no deduplication functionality, the found one or more other storage systems have deduplication functionality, then virtualizing, copying, or migrating the volume of the found storage system to one of the one or more other storage systems and selecting the one storage system having the virtualized, copied, or migrated volume.

14. The method according to claim 10, wherein the server is selected based on whether performance of the server is more important than capacity efficiency of the server or not.

15. A method for managing a plurality of servers and a plurality of storage systems, the method comprising:
storing server information identifying functionalities which can be executed by each of the plurality of servers and applications running on each of the plurality of servers, and storage system information identifying functionalities which can be executed by each of the plurality of storage systems and application data stored in each of the plurality of storage systems;
selecting a server, in which an application is to be deployed, from the plurality of servers, and a storage system, on which a volume either contains data to be used to deploy the application or maps to another volume that contains the data to be used to deploy the application, from the plurality of storage systems, based on the server information and the storage system information; and
requesting to deploy the application on the selected server and create the volume on the selected storage system,
wherein the server is selected based on whether performance of the server is more important than capacity efficiency of the server or not, and
wherein selecting the server comprises:
determining whether one or more servers of the plurality of servers have deduplication functionality;
determining whether one or more servers of the plurality of servers have one or more other applications running thereon that are deployed from a same application catalog as the application;
determining whether one or more servers of the plurality of servers have loads that are below a preset server load threshold;
when the performance of the selected server is not more important than the capacity efficiency of the server, and if one or more servers of the plurality of servers have deduplication functionality, have one or more other applications running thereon that are deployed from the same application catalog as the application, and have loads that are below the preset server load threshold (criterion 1), then selecting the server having the lowest load from the one or more servers under criterion 1;
when the performance of the selected server is not more important than the capacity efficiency of the server, and if one or more servers of the plurality of servers have deduplication functionality, and have loads that are below the preset server load threshold, but do not have one or more other applications running thereon that are deployed from the same application catalog as the application (criterion 2), then selecting the server having the lowest load from the one or more servers under criterion 2;
when one or more servers of the plurality of servers have loads that are below the preset server load threshold, but do not have deduplication functionality and do not have one or more other applications running thereon that are deployed from the same application catalog as the application (criterion 3), then selecting the server having the lowest load from the one or more servers under criterion 3.

16. The method according to claim 15, wherein selecting the storage system comprises:
finding a storage system from the plurality of storage systems which has a volume containing a golden image of the application;
determining whether the found storage system has a storage load below a preset storage load threshold;
when the server was selected from the one or more servers under criterion 1 or criterion 2 and when the found storage system has the storage load below the preset storage load threshold, then selecting the found storage system; and
when the server was selected from the one or more servers under criterion 1 or criterion 2 and when the found storage system has the storage load not below the preset storage load threshold, then virtualizing, copying, or migrating the volume of the found storage system to another storage system of the plurality of storage systems and selecting the another storage system.

17. The method according to claim 15, wherein selecting the storage system comprises:
finding a storage system from the plurality of storage systems which has a volume containing a golden image of the application;
determining whether the found storage system has deduplication functionality;
determining whether the found storage system has a storage load below a preset storage load threshold;
when the server was selected from the one or more servers under criterion 3, the found storage system has deduplication functionality, and the found storage system has the storage load below the preset storage load threshold, then selecting the found storage system; and
when the server was selected from the one or more servers under criterion 3, the found storage system has deduplication functionality, and the found storage system has the storage load not below the preset storage load threshold, then virtualizing, copying, or migrating the volume of the found storage system to another storage system of the plurality of storage systems and selecting the another storage system.

18. The method according to claim 15, wherein selecting the storage system comprises:
finding a storage system from the plurality of storage systems which has a volume containing a golden image of the application;
determining whether the found storage system has deduplication functionality;
determining whether the found storage system has a storage load below a preset storage load threshold;
finding one or more other storage systems of the plurality of storage systems that include a same virtual storage as one that the found storage system includes;
determining whether the found one or more other storage systems have deduplication functionality;
when the server was selected from the one or more servers under criterion 3, the found storage system has no deduplication functionality, one or more other storage systems of the plurality of storage systems include the same virtual storage as one that the found storage system includes and do not have deduplication functionality, and the found storage system has the storage load below the preset storage load threshold, then selecting the found storage system;
when the server was selected from the one or more servers under criterion 3, the found storage system has no deduplication functionality, one or more other storage systems of the plurality of storage systems include the same virtual storage as one that the found storage system includes and do not have deduplication functionality, and the found storage system has the storage load not below the preset storage load threshold, then virtualizing, copying, or migrating the volume of the found storage system to another storage system of the plurality of storage systems and selecting the another storage system; and when the server was selected from the one or more servers under criterion 3, the found storage system has no deduplication functionality, one or more other storage systems of the plurality of storage systems include the same virtual storage as one that the found storage system includes and have deduplication functionality, then virtualizing, copying, or migrating the volume of the found storage system to one of the one or more other storage systems and selecting the one storage system having the virtualized, copied, or migrated volume.

* * * * *